(12) United States Patent
Kanaya et al.

(10) Patent No.: US 8,199,431 B2
(45) Date of Patent: Jun. 12, 2012

(54) MAGNETIC HEAD INCLUDING SENSOR

(75) Inventors: Takayasu Kanaya, Tokyo (JP); Yosuke Antoku, Tokyo (JP); Kazuki Sato, Tokyo (JP); Takayuki Nishizawa, Tokyo (JP); Kosuke Tanaka, Tokyo (JP); Masaru Iida, Tokyo (JP); Kazumi Nakatogawa, Tokyo (JP); Eric Cheuk Wing Leung, Hong Kong (CN); Man Tse, Hong Kong (CN)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 109 days.

(21) Appl. No.: 12/756,640

(22) Filed: Apr. 8, 2010

(65) Prior Publication Data

US 2011/0249363 A1    Oct. 13, 2011

(51) Int. Cl.
    *G11B 21/21*    (2006.01)
(52) U.S. Cl. ........................................ 360/128
(58) Field of Classification Search .................. None
    See application file for complete search history.

(56) References Cited

U.S. PATENT DOCUMENTS

| 6,071,007 | A * | 6/2000 | Schaenzer et al. ............... 374/7 |
| 6,760,182 | B2 * | 7/2004 | Bement et al. .................. 360/75 |
| 7,064,930 | B2 * | 6/2006 | Serpe et al. ................. 360/236.5 |
| 7,092,208 | B2 * | 8/2006 | Zou et al. ...................... 360/128 |
| 7,274,538 | B2 * | 9/2007 | Thurn et al. ................. 360/294.7 |
| 7,403,356 | B1 * | 7/2008 | Mallary et al. ............. 360/235.1 |
| 7,589,928 | B2 | 9/2009 | Roy et al. |
| 7,616,397 | B2 * | 11/2009 | Hayakawa et al. ............. 360/75 |
| 7,755,867 | B2 * | 7/2010 | Mei et al. .................... 360/294.7 |
| 2002/0122268 | A1 * | 9/2002 | Bement et al. .................. 360/75 |
| 2002/0176208 | A1 * | 11/2002 | Serpe et al. ................ 360/235.7 |
| 2003/0011932 | A1 * | 1/2003 | Mei et al. .................... 360/234.3 |
| 2007/0195449 | A1 * | 8/2007 | Feist et al. ...................... 360/75 |
| 2008/0007871 | A1 | 1/2008 | Kiyono et al. |
| 2008/0043355 | A1 | 2/2008 | Ota |
| 2008/0094755 | A1 | 4/2008 | Ota et al. |

FOREIGN PATENT DOCUMENTS

| JP | A-H08-167121 | 6/1996 |
| JP | B2-2953417 | 7/1999 |
| JP | B2-2980074 | 9/1999 |
| JP | A-2004-164797 | 6/2004 |

OTHER PUBLICATIONS

C. Dennis Mee and Eric D. Daniel, *Magnetic Recording Technology*, Mar. 1996, Second Edition, pp. 1.12-1.14.

* cited by examiner

*Primary Examiner* — Mark Blouin
(74) *Attorney, Agent, or Firm* — Posz Law Group, PLC

(57) ABSTRACT

A magnetic head disposed in a slider, that is arranged at an interval from a magnetic disk includes a sensor disposed in a position that is opposed to the magnetic disk, a heat conductive film that is positioned on an air bearing surface opposed to the magnetic disk, and that is formed so as to overlap the sensor, of which a height in a direction perpendicular to the air bearing surface is more than a height of the sensor, and that transfers a temperature change of the air bearing surface to the sensor, and a pair of lead films electrically connected to the sensor and not electrically connected to the heat conductive film.

18 Claims, 11 Drawing Sheets

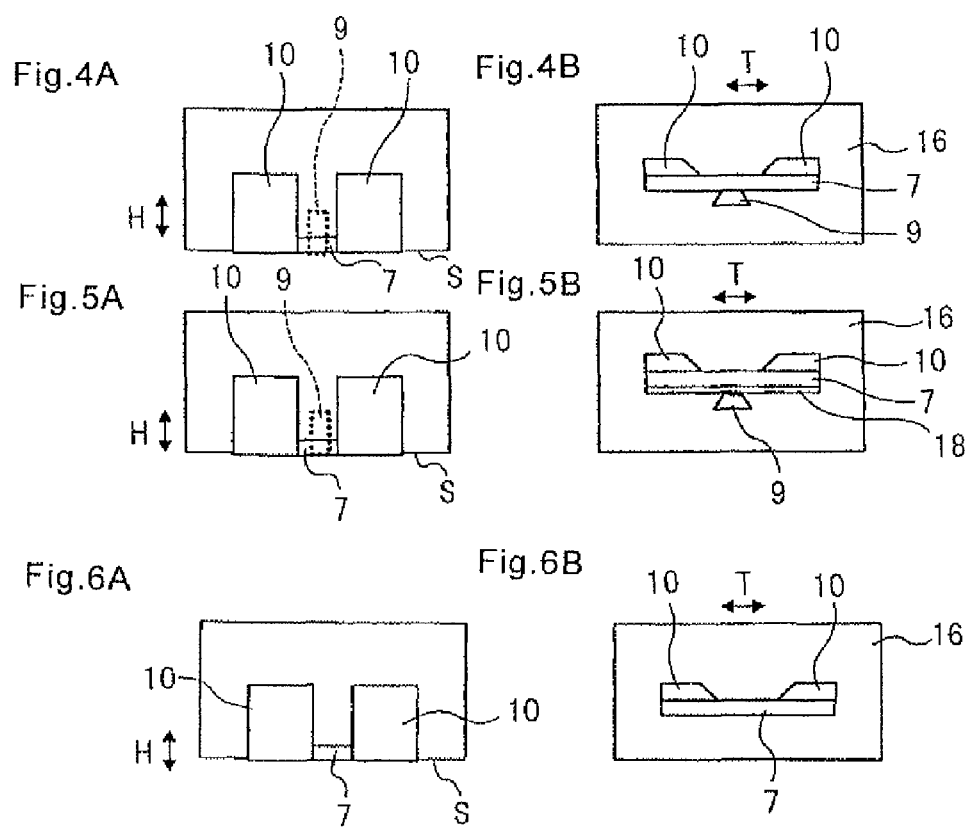

Fig.18A
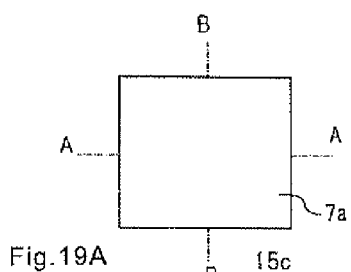
Fig.19A
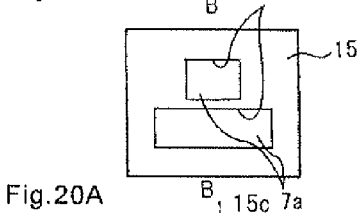
Fig.20A
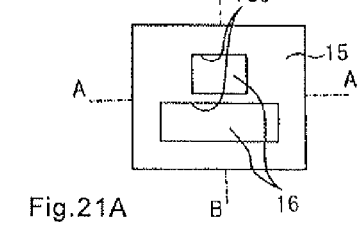
Fig.21A
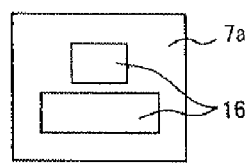
Fig.22A
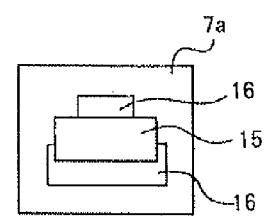
Fig.18B  Fig.18C
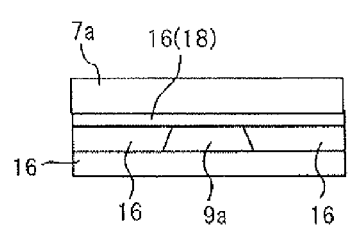 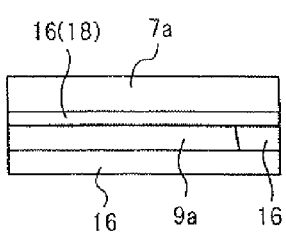
Fig.20B  Fig.20C
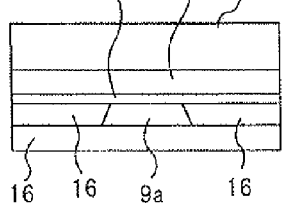 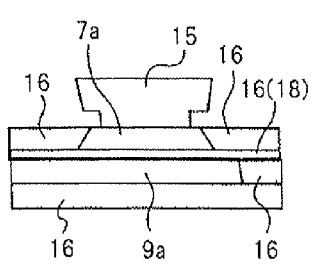

MAGNETIC HEAD INCLUDING SENSOR

BACKGROUND OF THE INVENTION

1. Field of the Invention

The present invention relates to a magnetic head that incorporates a sensor for detecting the presence or absence of a projection on a surface of a magnetic disk, and that is used for writing information on the magnetic disk and/or reading information from the magnetic disk.

2. Description of the Related Art

A magnetic head, such as a hard disk device, is arranged at an interval apart from a surface of a rotating magnetic disk, and functions to write information on the magnetic disk and/or to read information from the magnetic disk. In recent years, in association with high density recording on the magnetic disk, the interval between the magnetic head and the surface of the magnetic disk (a flying height of the magnetic head) has become extremely small. The interval is set at, for example, 10 nm or less. In such a case where the flying height of the magnetic head is very minute, when the flying height of the magnetic head is fluctuated for some reason or there is an unintentional projection on the surface of the magnetic disk, the magnetic head may contact the surface of the magnetic disk, thereby damaging the magnetic head. Therefore, in order to control the magnetic head so as not to contact the magnetic disk, it is desirable to control the flying height of the magnetic head and to preliminarily detect the presence or absence of the projection on the surface of the magnetic disk.

In Japanese Patent Laid-Open Publication No. 2004-164797, a projection detection head having a sensor for detecting a projection formed on a surface of a magnetic disk is disclosed. This sensor is arranged on an air bearing surface of a slider including the projection detection head, and detects a resistance change due to frictional heat generated by contact between the projection detection head and the magnetic disk. Since this configuration is configured with not only the magnetic head but also the projection detection head, the configuration is extremely complex, or two devices (a magnetic disk device and the projection detection device) are required. Therefore, this results in a complex configuration and an increase in cost.

In Japanese Patent Laid-Open Publication No. H8-167121, Japanese Patent No. 2,953,417, and Japanese Patent No. 2,980,074, another configuration is disclosed. In the configuration, a magneto-resistance (MR) element that actually works as a reproducing element of a magnetic disk device is used as a sensor for detecting a resistance change due to frictional heat generated by contact between a magnetic head and a magnetic disk. In Japanese Patent No. 2,953,417 and Japanese Patent No. 2,980,074 among the documents, the MR element is positioned in a stepped-back position from an air bearing surface that is opposite to the magnetic disk, and is connected to a heat conductive film exposed on the air bearing surface.

In the prior art, the presence or absence of the unintentionally formed projection (abnormal projection) on the surface of the magnetic disk is detected, and the sensor does not exercise a special functional effect when a normal magnetic disk is used on which an unintentional projection is not present.

For a sensor for detecting the resistance change due to the frictional heat generated by contact between the magnetic head and the magnetic disk, when such a sensor is away from a position where the magnetic head directly contacts the magnetic disk, it is sometimes impossible to detect the contact. However, it is necessary for the reproducing element of the magnetic disk device to be positioned in a suitable position for reproducing information. Accordingly, the reproducing element may be positioned at an unsuitable position as the sensor for detecting the contact. A tunnel magneto-resistance (TMR) element that has been the mainstream of a reproducing element in recent years is not appropriate when the flying height of the magnetic head is small as described above. That is because a change in an electrical resistance value of a barrier layer caused by a change in heat is small so that detection sensitivity is not excellent.

In U.S. Pat. No. 7,589,928, a device is disclosed for measuring a flying height of a magnetic head from the magnetic disk, i.e., an interval between the magnetic head and the surface of the magnetic disk regardless of the presence or absence of a projection on a surface of a magnetic disk. In this device, a configuration with a sensor is disclosed in addition to a recording element and a reproducing element of the magnetic head. The sensor is disposed for detecting a temperature change due to a change in the flying height of the magnetic head from the magnetic disk.

As described above, in order to detect a temperature change on the air bearing surface based on a resistance change of the sensor, it is desired that large resistance change easily occurs. Ordinarily, regarding a material such as metal, electrical resistance increases as the length along a direction where current flows increases. Also, it is known that large resistance change easily occurs. However, in the magnetic head, when a width in a track direction becomes wider by making the sensor larger, a range of sensing becomes larger. It makes difficult to accurately detect a position of a projection on the magnetic disk where each track width is minute due to progress in high density recording.

Specifically, the electrical resistance value of the sensor is obtained when voltage is applied between a pair of lead films to which both of edge parts in the track direction of the sensor are respectively connected and the sense current flows. When detecting the projection on the certain track on the magnetic disk, if the sensor which is wider in the track direction is used to make the detection of the resistance change easier, it may include an adjacent track to the track with a projection as a sensing area. As a result, sometimes, it is difficult to pinpoint a track with a projection. In order to detect minute projections in a specific track without affecting an adjacent track, it is desired to narrow a width in a track direction of the sensor. However, when the width in the track direction of the sensor is narrowed, an interval between a pair of lead films becomes smaller and the electrical resistance value of the sensor becomes smaller. As a result, to total electrical resistance value of all paths in which the sense current flows, a ratio of an electrical resistance value and a contact resistance of the lead films increases, a ratio of part (the electrical resistance value of the sensor) attributed to the resistance change decreases, and a detection sensitivity decreases. Therefore, it is difficult to accurately detect a position of minute projection having small frictional heat.

SUMMARY OF THE INVENTION

An object of the present invention is to provide a magnetic head incorporating a sensor that can detects a contact to a magnetic disk in high sensitivity even if targeting a magnetic disk that is high density and has a minute track width.

A magnetic head of the present invention that is disposed in a slider, that is arranged at an interval from a magnetic disk includes a sensor disposed in a position that is opposed to the magnetic disk; a heat conductive film that is positioned on an air bearing surface opposed to the magnetic disk, and that is formed so as to overlap the sensor, of which a height in a direction perpendicular to the air bearing surface is more than a height of the sensor, and that transfers a temperature change of the air bearing surface to the sensor; and a pair of lead films electrically connected to the sensor and not electrically connected to the heat conductive film. The heat conductive film overlaps the sensor either directly or through an insulating film.

The sensor may be positioned stepped back from the air bearing surface by a distance in a range from 10 nm to 200 nm.

The pair of lead films is respectively connected to both edge parts of the sensor in a track direction of the magnetic disk, and a width of the heat conductive film is narrower than a width of the sensor in the track direction. Further, a width of the heat conductive film is narrower than an interval between the pair of lead films in the track direction. However, even if the width of the heat conductive film is equal to or larger than the width of the sensor, or even if the width of the heat conductive film is equal to or larger than the interval between the pair of lead films in the track direction, the present invention is effective. In these cases, an insulating layer is positioned between the heat conductive film and the sensor.

The magnetic head further includes a heater that is disposed in the slider and that enables a flying height of the magnetic head from the magnetic disk to be small, by causing heat expansion of the slider.

An electrical resistance value of the sensor is changed due to a temperature change of the air bearing surface transferred through the heat conductive film, and the pair of lead films is respectively connected to both edge parts of the sensor and applies voltage to the sensor.

The above mentioned object, features, and advantages of the present invention and other objects, features, and advantages will be disclosed by the following descriptions referring to the figures illustrating embodiments of the present invention.

BRIEF DESCRIPTION OF THE DRAWINGS

FIG. 4A is a view of the magnetic head of one example of the present invention seen from an integration surface side.

FIG. 4B is a view illustrating an air bearing surface of the magnetic head illustrated in FIG. 4A.

FIG. 5A is a view of the magnetic head of the other example of the present invention seen from the integration surface side.

FIG. 5B is a view illustrating the air bearing surface of the magnetic head illustrated in FIG. 5A.

FIG. 6A is a view of the magnetic head of a comparative example seen from the integration surface side.

FIG. 6B is a view of the air bearing surface of the magnetic head illustrated in FIG. 6A.

FIG. 18A is a view illustrating a step of the manufacturing method of the main part of the magnetic head of the present invention seen from the integration surface side, the step following FIGS. 17A through 17C.

FIG. 18B is a view illustrating the step of the manufacturing method of the main part of the magnetic head of the present invention seen from the air bearing surface side, the step following FIGS. 17A through 17C.

FIG. 18C is a view illustrating the step of the manufacturing method of the main part of the magnetic head of the present invention seen from the height direction, the step following FIGS. 17A through 17C.

FIG. 19A is a view illustrating a step of the manufacturing method of the main part of the magnetic head of the present invention seen from the integration surface side, the step following FIGS. 18A through 18C.

FIG. 20A is a view illustrating a step of the manufacturing method of the main part of the magnetic head of the present invention seen from the integration surface side, the step following FIG. 19A.

FIG. 20B is a view illustrating the step of the manufacturing method of the main part of the magnetic head of the present invention seen from the air bearing surface side, the step following FIG. 19A.

FIG. 20C is a view illustrating the step of the manufacturing method of the main part of the magnetic head of the present invention seen from the height direction, the step following FIG. 19A.

FIG. 21A is a view illustrating a step of the manufacturing method of the main part of the magnetic head of the present invention seen from the integration surface side, the step following FIGS. 20A through 20C.

FIG. 22A is a view illustrating a step of the manufacturing method of the main part of the magnetic head of the present invention seen from the integration surface side, the step following FIG. 21A.

DESCRIPTION OF THE PREFERRED EMBODIMENTS

Hereafter, embodiments of the present invention will be explained with reference to the drawings.

Figure 1A:
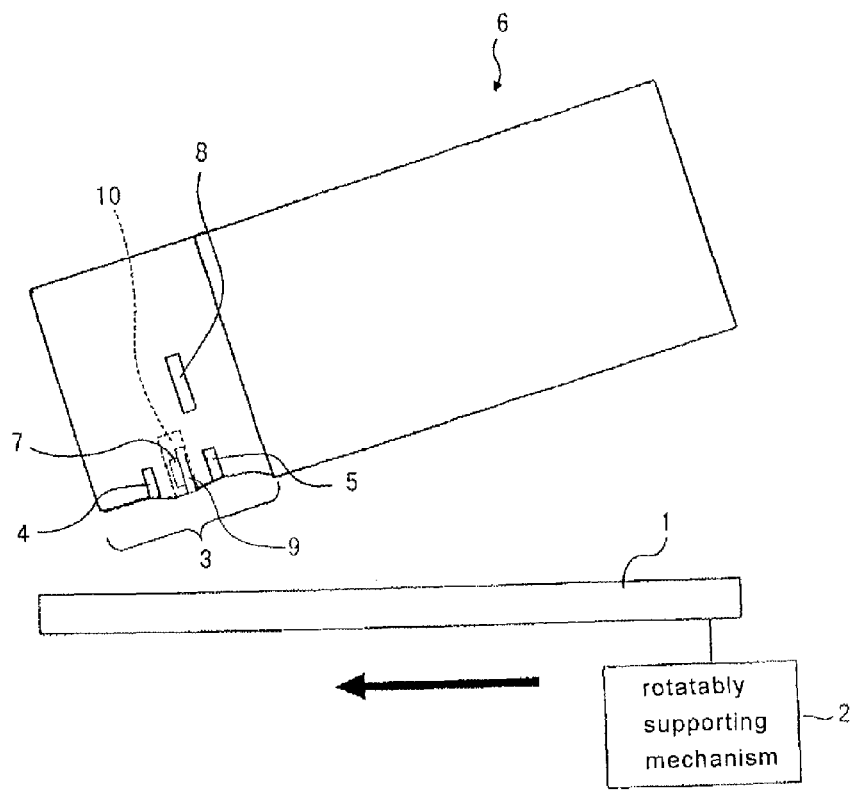
FIG. 1A is a schematic view of a main part of a hard disk device in one embodiment of the present invention illustrating a heater in a non-driven state.
Figure 1B:
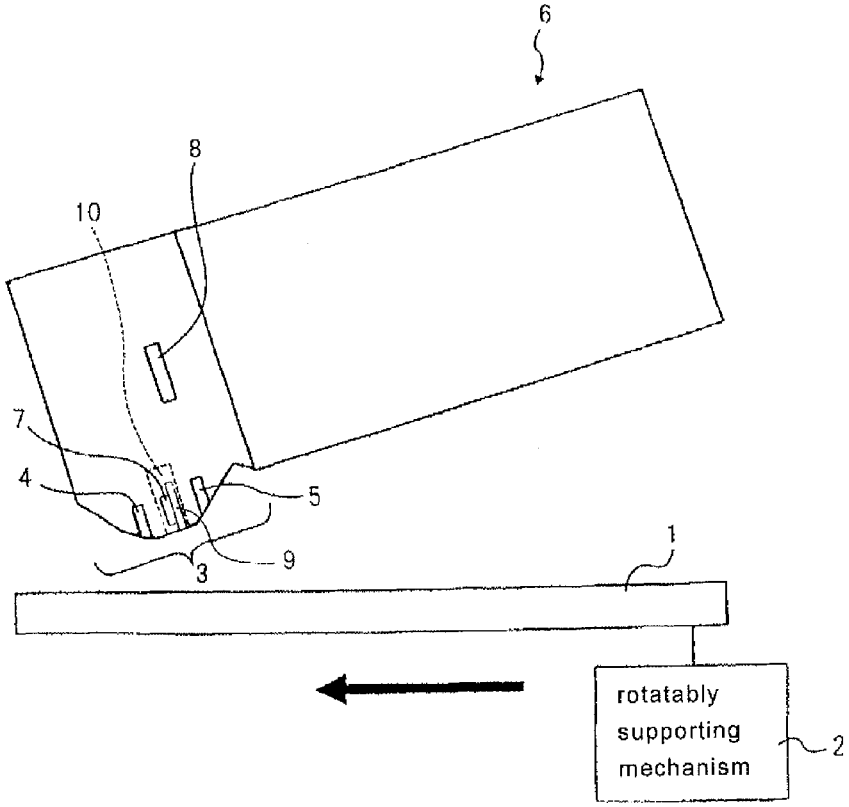
FIG. 1B is a schematic view of the main part of the hard disk device in one embodiment of the present invention illustrating a heater in a driven state.

FIGS. 1A and 1B are schematic views illustrating a main part of a hard disk device that is one example of a device to which the present invention is applied. The hard disk device provides for a rotatably supporting mechanism 2 that rotatably supports a magnetic disk (hard disk) 1 and a slider 6 that is positioned in a position opposite to the rotatably supporting mechanism 2. A magnetic head 3 is formed at a tip part of the slider 6. The magnetic head 3 has a recording element part (a writing part) 4, a reproducing element part (a reading part) 5, a sensor 7, a heater 8, a heat conductive film 9 and lead films 10. Magnetic information can be written by the recording element part 4 of the magnetic head 3 on the magnetic disk 1 that is supported and rotated by the rotatably supporting mechanism 2. The reproducing element part 5 of the magnetic head 3 can read magnetic information recorded on the magnetic disk 1.

The sensor 7 of the magnetic head 3 is arranged separated from the reproducing element part 5. The sensor 7, as well as a thermal asperity effect element sensor described in U.S. Patent Application Publication No. 2008/007871 does, can measure an internal electrical resistance value and is used to detect a contact between the magnetic head 3 and a surface of the magnetic disk 1. The sensor 7 of the present embodiment is made of NiFe having a thickness of 30 nm, is not exposed on an air bearing surface S, and is positioned stepped back from the air bearing surface S by distance in a range from 10 nm to 200 nm. However, the sensor 7 can be made of a metal such as Ni, Ti, W, Pt, Ta, Ru, Au or the like, or an alloy or a lamination film including one or more types of these metals. The sensor 7 can be exposed without being stepped back from the air bearing surface S. The sensor 7 is preferably arranged in a position within 2 μm or less from a point of contact of the magnetic head 3 with the magnetic disk 1.

The heat conductive film 9 is formed in a manner of overlapping a part of the sensor 7 and is exposed on the air bearing surface S. The heat conductive film 9 of the present embodiment is made of AuCu having a thickness of 30 nm, and a height in a height direction H (see FIG. 2) orthogonal to the air bearing surface S is equal to or larger than a height of the sensor 7. The heat conductive film 9 is preferably made of a material having a heat conductive ratio of 70 W/(m·k) or more, and in addition to AuCu, the heat conductive film 9 can be made of a metal such as Ag, Al, Au, Co, Cu, In, Ir, Mo, Ni, Os, Rh, Ru, W, Zn, Pt or the like, or an alloy or a lamination film that includes one or more kinds of these metals.

Although it is not described in detail, a circuit that applies voltage to the sensor 7 to measure the electrical resistance value of the sensor 7 is configured. The lead film 10 that composes a part of the circuit contacts and electrically connects to the sensor 7. In the present embodiment, a pair of the lead films 10 is arranged in a manner of contacting both edge parts in a track direction (a direction orthogonal to a lamination direction of each layer of the magnetic head 3) of the sensor 7. The lead films 10 are exposed on the air bearing surface S. However, the lead films 10 may not be exposed on the air bearing surface S.

Parts of the air bearing surface S of the present embodiment are configured by an insulating film 16 made of alumina or the like. The parts of the air bearing surface S exclude the heat conductive film 9 and the lead films 10, and include a part where the sensor 7 is covered. Excepting parts where an asperity is intentionally formed, the insulating film 16 of the air bearing surface S is formed as an entirely plane surface. This contributes to realize a desired flying orientation and flying height of the slider 6.

As well as a heater described in U.S. Patent Publication No. 2008/0043355, U.S. Patent Publication No. 2008/94755, and U.S. Patent Publication No. 2008/007871, the heater 8 of the magnetic head 3 causes at least a part of the slider 6 to expand due to heat generation and can cause the magnetic head 3 to become closed relative to the magnetic disk 1. FIG. 1A illustrates a positional relationship between the magnetic disk 1 and the slider 6 when the heater 8 is in a non-driven state. FIG. 1B illustrates a positional relationship between the magnetic disk 1 and the slider 6 where they are closed by the heater 8 being driven. A detail will be described later regarding a configuration of a head gimbal assembly 220 including the magnetic head 3 and the slider 6.

In the present embodiment, for example, in order to detect the presence or absence of a projection on a surface of the magnetic disk 1 supported by the rotatably supporting mechanism 2, an electrical resistance value of the sensor 7 is obtained. Specifically, a voltage is applied to the sensor 7 through the lead films 10, and the electrical resistance value is obtained by detecting current at the time. On the air bearing surface S, the heat conductive film 9 having high heat conductivity is exposed. The heat conductive film 9 with high sensitivity detects a temperature change of the air bearing surface S, i.e., frictional heat mainly due to a contact of the magnetic head 3 with the magnetic disk 1, and efficiently transfers it to the sensor 7. In other words, when the projection exists on the surface of the magnetic disk 1, the magnetic head 3 contacts the projection, friction occurs at the contact part between the air bearing surface S of the magnetic head 3 and the projection on the surface of the magnetic disk 1, and temperature drastically increases due to the frictional heat. This drastic increase in temperature is transferred to the sensor 7 through the heat conductive film 9 having the high heat conductivity, and the electrical resistance value is increased according to the increase in the temperature of the sensor 7. This is based on a characteristic that the electrical resistance value of metals increases according to increase in temperature. This increase in the electrical resistance value of the sensor 7 is detected by a circuit (not illustrated) connected to the lead films 10. As a result, the contact of the magnetic head 3 with the magnetic disk 1 is detected, and thereby an existence of the projection is determined. The position (track) where the projection is located on the magnetic disk 1 is obtained by confirming a position of the magnetic head 3 when the projection is detected in this way.

In the present embodiment, the heat conductive film 9 having high heat conductivity (heat conductivity is higher than the sensor 7 in some cases) detects with high sensitivity the temperature change on the air bearing surface S and transfers it to the sensor 7. Therefore, a sensing range of the present embodiment corresponds not to the sensor 7 itself but to a size of the heat conductive film 9. For example, the position where the projection is on the surface of the magnetic disk 1 can be sensitively obtained when the width of the track direction of the heat conductive film 9 is formed smaller than the sensor 7 so that the sensing range becomes smaller. Then, by making the size of the sensor 7 itself relatively large and especially increasing its width in the track direction, a configuration having a large electrical resistance value that easily generates a large resistance change can be obtained. As described above, according to the present embodiment, increasing in the detection accuracy by minimizing the sensing range and realizing high sensitivity by increasing the resistance change are compatible.

This configuration is used to obtain an interval (a flying height of the magnetic head 3) between the magnetic head 3 and the surface of the magnetic disk 1. For example, outputs of the sensor 7 are respectively measured. One output is measured when the flying height must be measured, and the other output is measured when the flying height is zero, i.e., the magnetic head 3 contacts the magnetic disk 1. Then, the flying height of the magnetic head 3 is obtained based on the measured results and by applying, for example, the known Wallace equation (see C. Dennis Mee, Eric D. Daniel "Magnetic Recording Technology Second Edition" pp. 1.12-1.14, March 1996).

When a width of the track direction of the heat conductive film 9 is smaller than the sensor 7, i.e., is smaller than an interval between a pair of the lead films 10, the heat conductive film 9 does not enable the pair of the lead films 10 to be electrically connected. The heat conductive film 9 does not become a conductive path that connects in parallel to the conductive path configured by the pair of the lead films 10 and the sensor 7. Therefore, the detection sensitivity and efficiency of the resistance change does not deteriorate because of the small resistance change of the sensor 7 due to the parallel current. Strictly speaking, it is considered that there is a parallel conductive path, with respect to the conductive path passing inside the sensor 7, that passes from a side of the sensor 7 through the heat conductive film 9 and to the other side of the sensor 7. However, as will be described below, as long as the width in the track direction of the heat conductive film 9 is not excessively long, the parallel conductive path has only a negligible effect on the detection of the resistance change.

As described above, since its height in a height direction H orthogonal to the air bearing surface S is higher than a height of the sensor 7, the heat conductive film 9 of the present embodiment can efficiently transfer heat to the entirety of the sensor 7 in the height direction H. Assuming that the height of the sensor 7 in the height direction H orthogonal to the air bearing surface S is higher than the height of the heat conductive film 9, a portion where the sensor 7 is not opposed to the heat conductive film 9 in the height direction H is made. The heat from the heat conductive film 9 becomes difficult to be transferred to the part, and the detection efficiency deteriorates. However, in the present embodiment, since the entirety of the sensor 7 in the height direction H is opposite to the heat conductive film 9, the detection efficiency is good.

Figure 2:
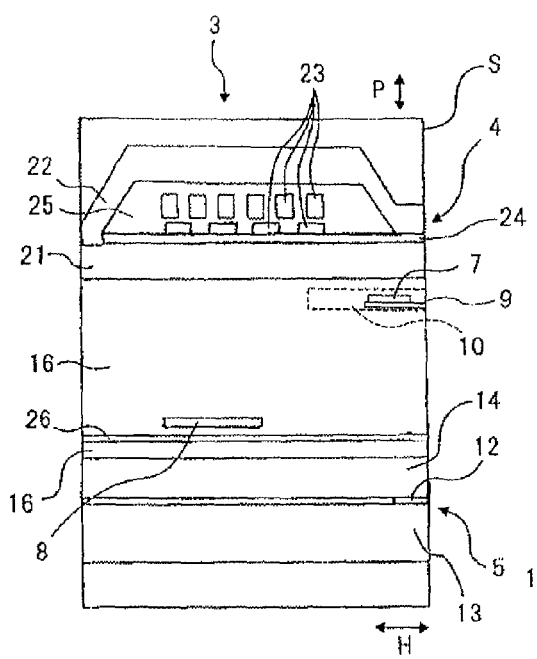
FIG. 2 is a cross-sectional view illustrating a structure of the magnetic head illustrated in FIGS. 1A and 1B.

As shown in FIGS. 1A, 1B and 2, when the sensor 7 is not exposed on the air bearing surface S and is positioned in a stepped-back position from the air bearing surface S, and where a surface of the sensor 7 is protected by an insulating film 16 made of, for example, alumina, even if the magnetic head 3 repeatedly contacts the magnetic disk 1, the height in the height direction H of the sensor 7 does not change and the electrical resistance value does not change. Due to the effect caused by the contact of the magnetic head 3 and the magnetic disk 1, physical reliability and resistance of the sensor 7 does not deteriorate. Accordingly, even if contact between the magnetic head 3 and the magnetic disk 1 is repeated to detect the projection on the surface of the magnetic disk 1 or to measure a flying height of the magnetic head 3 from the magnetic disk 1, the measurement performance of the sensor 7 does not change so that the measurement can be repeated in the same condition and the reliability is high. Moreover, since a shape and/or a size of the sensor 7 does not affect a shape and/or a size of the air bearing surface S, there is no restriction on the type of materials for forming the sensor 7.

Next, one example of the magnetic head 3 of the present invention will be explained in detail with reference to FIGS. 2 and 3.

The magnetic head 3 of the present embodiment has a recording element part (a writing part) 4 and a reproducing element part (a reading part) 5. The reproducing element part 5 has a magneto-resistance (MR) element 12 and first and second shield layers 13 and 14 that are arranged in a manner of sandwiching the MR element 12 in a film surface orthogonal direction P of the MR element 12. The MR element 12 can be either a giant magneto-resistance (GMR) element or a TMR element. The first shield layer 13 and the second shield layer 14 function as an electric pole through which a sense current flows in the film surface orthogonal direction P of the MR element 12.

An interelement shield layer 26 is arranged above the second shield layer 14. The recording element part 4 is arranged above the interelement shield film 26. The recording element part 4 has a configuration for so-called perpendicular magnetic recording. A magnetic pole layer for writing is composed of a main magnetic pole layer (lower yolk) 21 and an auxiliary magnetic pole layer (upper yolk) 22. The main magnetic pole layer 21 is made of FeCo and is exposed in a direction nearly orthogonal to the air bearing surface S on the air bearing surface S that is opposite to the magnetic disk 1 of a recording medium. In the periphery of the main magnetic pole layer 21, a coil layer 23 is wound, which extends over a gap layer 24 that is made of an insulating material, and the coil layers 23 induce a magnetic flux to the main magnetic pole layer 21. This magnetic flux is guided in the main magnetic pole layer 21 and is emitted toward the magnetic disk 1 of the recording medium (see FIGS. 1A and 1B) from the air bearing surface S.

The insulating films 16 made of an insulating material such as alumina or the like are arranged among each of the shield layers, each of the elements or the like. In the insulating film 16, the above described sensor 7, a heat conductive film 9 that is formed so as to overlap the sensor 7, and the pair of lead films 10 positioned at both end parts of the sensor 7 in the track direction are arranged.

The auxiliary magnetic pole layer 22 is a magnetic layer that is magnetically coupled to the main magnetic pole layer 21. The auxiliary magnetic pole layer 22 is a magnetic pole layer that is made of an alloy made of two or three of Ni, Fe, Co or the like. The auxiliary magnetic pole layer 22 is arranged in a manner of branching from the main magnetic pole layer 21. The auxiliary magnetic pole layer 22 is opposite to the main magnetic pole layer 21 through the gap layer 24 and a coil insulating layer 25 in the air bearing surface S side.

Figure 3:
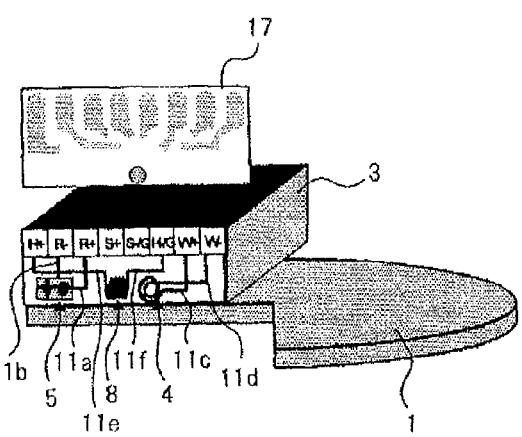
FIG. 3 is a schematic view illustrating electrical connections of the magnetic head illustrated in FIG. 2.

In FIG. 3, electrical wirings in the magnetic head 3 are schematically illustrated. As illustrated in FIG. 3, the magnetic head 3 has a pair of electrical connection parts 11a and 11b that connect to the reproducing element part 5, a pair of electrical connection parts 11c and 11d that connect to the recording element part 4, and a pair of electrical connection parts 11e and 11f that connect to the heater 8. Moreover, although not illustrated in FIG. 3, as described above, the lead films 10 that are electrically connected to the sensor 7 are arranged. Additionally, FIG. 3 schematically illustrates the structure that is extracted from the magnetic head 3, which is a connection substrate 17 arranged in the magnetic head 3. The connection substrate 17 is a connection part connecting the electrical connection parts 11a through 11f and the lead films 10 to an external circuit (not shown).

Hereafter, in order to understand the characteristics of the magnetic head 3 of the present embodiment, an experiment performed by the present applicant will be explained.

Initially, in the first experiment, the present applicant manufactured three types of the magnetic head 3. Two types, i.e., the magnetic head 3 having a configuration illustrated in FIGS. 4A and 4B and the magnetic head 3 having a configuration illustrated in FIGS. 5A and 5B, are examples of the present invention. The magnetic head 3 having a configuration illustrated in FIGS. 6A and 6B is a comparative example to compare with the present invention. In all of the magnetic heads 3, sensors 7 were made of NiFe having a thickness of 30 nm, a width in a track direction T of 1000 nm, and a height in the height direction H of 200 nm, the height direction H being orthogonal to an air bearing surface S. Moreover, lead films 10 were made of AuCu having a thickness of 60 nm. Additionally, it did not matter whether or not a magnetic disk 1 used in following experiments had a projection on the surface.

In the magnetic head 3 of the present invention illustrated in FIGS. 4A and 4B, all of the sensor 7, a heat conductive film 9 and the lead films 10 were exposed on the air bearing surface S, and the sensor 7 and the heat conductive film 9 were directly overlapped. The heat conductive film 9 was made of AuCu having a thickness of 30 nm, and the height in the height direction H orthogonal to the air bearing surface S was a constant 300 nm. Fifty pieces for each of the magnetic heads 3 were manufactured. Each of the magnetic heads 3 had a width of the conductive film 9 in the track direction T of either 100 nm, 300 nm or 500 nm. In other words, fifty pieces for each of three types of the magnetic head 3 were manufactured. Each of the magnetic heads 3 was configured in the configuration illustrated in FIGS. 4A and 4B, and had a different width of the heat conductive film 9 in the track disk direction T.

In the magnetic head 3 of the present invention illustrated in FIGS. 5A and 5B, all of the sensor 7, the heat conductive film 9 and the lead films 10 were exposed on the air bearing surface S, the sensor 7 and the heat conductive film 9 were overlapped through the insulating film 18, for example, made of alumina or the like having the thickness of 5 nm. The heat conductive film 9 was made of AuCu having the thickness of 30 nm, and the height in the height direction H orthogonal to the air bearing surface S was a constant 300 nm. Then, fifty pieces for each of the magnetic heads 3 were manufactured. Each of the magnetic heads 3 had a width of the conductive film 9 in the track direction T of either 300 nm, 500 nm or 1000 nm. In other words, fifty pieces for each of three types of the magnetic head 3 were manufactured. Each of the magnetic heads 3 was configured in the configuration illustrated in FIGS. 5A and 5B, and had different width of the heat conductive film 9 in the track disk direction T. Additionally, the insulating film 18 and the insulating film 16 are preferably made of the same insulating material such as alumina, etc., and actually are not distinguishable in most cases because they are formed in an integrated manner. However, in the present specification, in order to clarify a functional effect of the insulating film 18 intervening between the sensor 7 and the heat conductive film 9, the insulating film 18 and the insulating film 16 may be distinctly described as a matter of convenience.

In the magnetic head 3 of the comparative example illustrated in FIGS. 6A and 6B, the sensor 7 and the lead films 10 were exposed on the air bearing surface S, and the heat conductive film 9 was not disposed. Fifty pieces of this magnetic head 3 were manufactured.

As described above, three types of the magnetic head 3 having the configuration illustrated in FIGS. 4A and 4B, three types of the magnetic head 3 having the configuration illustrated in FIGS. 5A and 5B, and one type of the magnetic head illustrated in FIGS. 6A and 6B were respectively manufactured. Sizes of each type of the sensor 7 and the heat conductive film 9 are shown in Table 1.

TABLE 1

| Configuration | Sensor 7 | | Heat Conductive Film 9 | |
|---|---|---|---|---|
| | Width (nm) | Height (nm) | Width (nm) | Height (nm) |
| FIGS. 4A and 4B | 1000 | 200 | 100 | 300 |
| | 1000 | 200 | 300 | 300 |
| | 1000 | 200 | 500 | 300 |
| FIGS. 5A and 5B | 1000 | 200 | 300 | 300 |
| | 1000 | 200 | 500 | 300 |
| | 1000 | 200 | 1000 | 300 |
| FIGS. 6A and 6B | 1000 | 200 | — | — |

Figure 7:
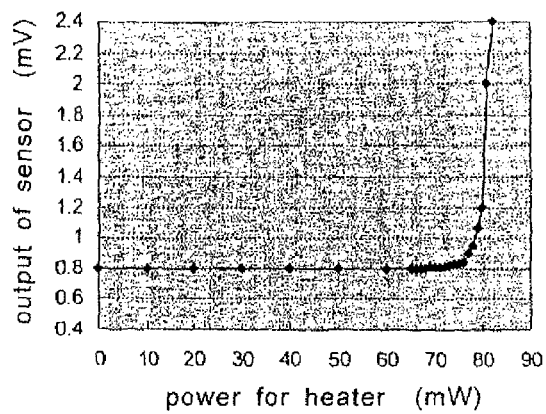
FIG. 7 is a graph illustrating a relation between power supplied to a heater and a detection output of a sensor of the magnetic head of the comparative example.

In the state where the slider 6 equipped with the magnetic head 3 was opposite to the magnetic disk 1, a heater 8 was activated to heat the magnetic head 3, and the heat expansion causes a part of the magnetic heads 3 to protrude toward and to contact the magnetic disk 1. Outputs (detection outputs) of the sensors 7 were measured. The outputs corresponded to the change in the electrical resistance values of the sensors 7 due to the frictional heat generated by the contact. At this time, a voltage applied from the lead films 10 to the sensor 7 to obtain the resistance change of the sensor 7 was 130 mV. In FIG. 7, the measurement results of the detection output of the comparative example, i.e., the conventional magnetic head 3 is illustrated. It is understood from FIG. 7 that, at the point when the applied electric power to the heater 8 was approximately 80 mW, the magnetic head 3 contacted the magnetic disk 1 and the electrical resistance value of the sensor 7 drastically increased.

Figure 8:
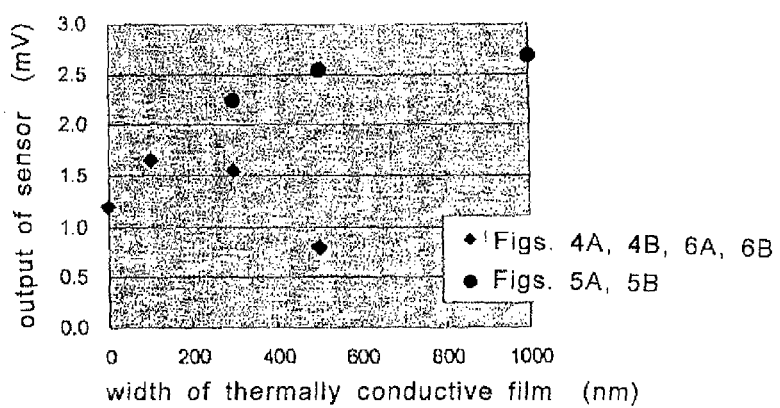
FIG. 8 is a graph illustrating a relation between a width in a track direction of a heat conductive film and a detection output of a sensor of the magnetic heads illustrated in FIGS. 4A through 6B.

Then, regarding each of pre-described magnetic heads 3, an output of the sensor 7 was measured when electrical power of 80 mW was applied to the heater 8. At this time, voltage applied from the lead films 10 to the sensor in order to obtain the resistance change of the sensor 7 was 130 mV. Then, an average value of the experimental results of the magnetic heads 3 of fifty pieces of the same type is illustrated in FIG. 8. A horizontal axis of FIG. 8 is a width in the track direction T of the heat conductive film 9, and a vertical axis is the output of the sensor 7. Results of the magnetic head 3 having the configurations illustrated in FIGS. 4A, 4B, 6A and 6B, and results of the magnetic head 3 having the configuration illustrated in FIGS. 5A and 5B are illustrated in different shaped plots. Also, results of the magnetic head 3 illustrated in FIGS. 4A and 4B are plotted at which the horizontal axis, i.e., the widths in the track direction T of the heat conductive film 9 are 100 nm, 300 nm and 500 nm. On the other hand, results of the magnetic head 3 illustrated in FIGS. 6A and 6B are plotted at which the width of the heat conductive film 9 in the track direction T is 0 nm in the horizontal axis.

When the heater 8 is driven by the same electric power, it is regarded that the sensor 7 having a larger output has high sensitivity and high detection accuracy. According to FIG. 8, it is understood that, at most times, the output of the sensor 7 in the case of a configuration of the present invention illustrated in FIGS. 4A, 4B, 5A and 5B is larger and more preferable than the case of a configuration of the comparative example illustrated in FIGS. 6A and 6B. This is a result in which the arrangement of the heat conductive film 9 in the present invention improved the transfer efficiency of the heat to the sensor 7. When the width in the track direction T of the heat conductive film 9 was excessively large (more than 300 nm) in the configuration illustrated in FIGS. 4A and 4B, a less preferable result than the case of the configuration illustrated in FIGS. 6A and 6B was obtained. This is because a conductive path passing from a side of the sensor 7 through the heat conductive film 9 and to the other side of the sensor 7 was connected in parallel to the conductive path passing inside the sensor 7, and the resistance change of the sensor 7 becomes smaller due to the parallel current. Accordingly, the width in the track direction T of the heat conductive film 9 preferably is not too wide and is approximately 300 nm or less.

According to FIG. 8, it is understood that, compared with the configuration illustrated in FIGS. 4A and 4B, the output of the sensor 7 with the configuration illustrated in FIGS. 5A and 5B is large and preferable. Due to the existence of the insulating film 18, a conductive path is not formed in the configuration illustrated in FIGS. 5A and 5B. The conductive path (a conductive path passing from a side of the sensor 7, through the heat conductive film 9 and to the other side of the sensor 7) is parallel to the conductive path passing inside the above-described sensor 7. Therefore, the resistance change of the sensor 7 cannot be small. Specially, when the width in the track direction T of the heat conductive film 9 is relatively large, a configuration in which the insulating film 18 is arranged is advantageous.

Next, in the configuration illustrated in FIGS. 5A and 5B, fifty pieces for each of the magnetic heads 3 were manufactured without modification of the sensor 7, the lead films 10, and the insulating film 18. In one of the magnetic heads 3, the width of the track direction T of the heat conductive film 9 was 500 nm, and the height of the height direction H orthogonal to the air bearing surface S was 100 nm. In the other magnetic head 3, the width of the track direction T of the heat conductive film 9 was 500 nm, and the height of the height direction H orthogonal to the air bearing surface S was 500 nm. Each of the magnetic heads 3 had a constant width in the track direction T of the heat conductive film 9. The size of the sensor 7 and the heat conductive film 9 for each type is shown in Table 2. In Table 2, and FIG. 9 that will be described later, data of the magnetic head 3 is shown. The magnetic head 3 is used in the above-described experiment and has the configuration illustrated in FIGS. 5A and 5B, a width of 500 nm in the track direction T of the heat conductive film 9, and a height of 300 nm in the height direction H orthogonal to the air bearing surface S.

TABLE 2

| | Sensor 7 | | Heat Conductive Film 9 | |
|---|---|---|---|---|
| Configuration | Width (nm) | Height (nm) | Width (nm) | Height (nm) |
| FIGS. 5A and 5B | 1000 | 200 | 500 | 100 |
| | 1000 | 200 | 500 | 300 |
| | 1000 | 200 | 500 | 500 |

Figure 9:
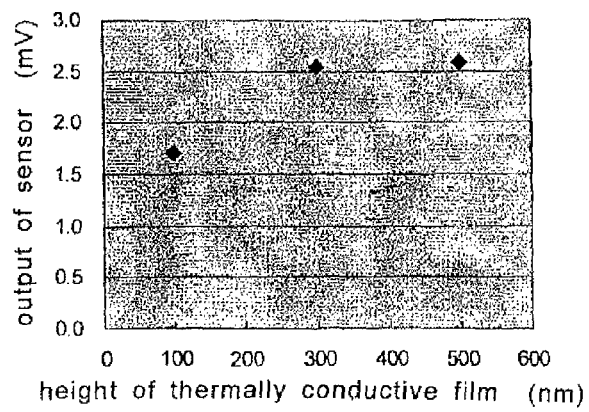
FIG. 9 is a graph illustrating a relation between a height in a direction orthogonal to the air bearing surface S of the heat conductive film and a detection output of a sensor of the magnetic heads illustrated in FIGS. 5A and 5B.

As same as the above-described experiment, the output of the sensor 7 when electrical power of 80 mW was applied to the heater 8 and a voltage of 130 mV was applied from the lead films 10 to the sensor 7 was measured. FIG. 9 illustrates an average value of the experimental result of the fifty pieces having the same type magnetic head 3. According to FIG. 9, the output of the sensor 7 is not large enough when the height in the height direction H orthogonal to the air bearing surface S of the heat conductive film 9 is smaller than the height of the height direction H of the sensor 7. The output of the sensor 7 is large and is preferable when the height in the height direction H of the heat conductive film 9 is greater than the height in the height direction H of the sensor 7. As described above, when the height in the height direction H of the heat conductive film 9 is greater than the height of the sensor 7, an entire area of the sensor 7 in the height direction H is opposed to the heat conductive film 9, and there is no portion of the sensor 7 that is not opposed to the heat conductive film 9. As a result, heat is efficiently transferred to the entirety of the sensor 7.

The size of the sensor 7 is not limited to the above-described example. Although, not described in detail, when the width in the track direction T was 50 nm to 3000 nm, the height in the height direction H orthogonal to the air bearing surface S was 50 nm to 400 nm, and the thickness of the film surface orthogonal direction P was 5 nm to 500 nm, the sensor 7 functioned as the sensor 7 of the present invention that detects the temperature change of the air bearing surface S by measuring the electrical resistance value. This was confirmed by the experiment of the present applicant.

In addition, in the explanations that are described above and in the explanations of manufacturing methods (see FIGS. 10A-27A), which will be described later, an example is explained. In the example, the width in the track direction T of the sensor 7 was wider than the width in the track direction T of the heat conductive film 9 when the sensor 7 was made of a metal, etc., and was formed with relatively large size, and the electrical resistance value and resistance change ratio was large. However, for example, in the case of using a sensor 7 made of a semiconductor, etc. and that has high electrical resistance value and high resistance change ratio, the sensor 7 is unnecessarily formed with a large size. Therefore, it is considered that the width in the track direction T of the heat conductive film 9 may be wider than the width in the track direction T of the sensor 7 and/or than an interval between the pair of the lead films 10. Even in such a case, according to the present invention, a contact resolution, i.e., the detection accuracy at the contact position of the magnetic head 3 and the magnetic disk 1, is determined by the size (especially the width in the track direction T) of the heat conductive film 9, unrelated to the size (especially the width in the track direction T) and/or the electrical resistance value and the resistance change ratio of the sensor 7. Accordingly, unrelated to the contact resolution, the sensor 7 is formed with an arbitrary size to obtain a desired electrical resistance value and resistance change amount. Unrelated to the electrical resistance value and the resistance change amount, the heat conductive film 9 is formed with an arbitrary size to obtain a desired contact resolution. Therefore, the present invention provides advantages in which the restrictions on designs of the sensor 7 and the heat conductive film 9 are small and the design flexibility is high. However, when the width of the heat conductive film 9 in the track direction T is equal to or greater than the width of the sensor 7 in the track direction T, or the width of the heat conductive film 9 in the track direction T is equal to or greater than the interval between the pair of the lead films 10, in order that the heat conductive film 9 does not function as a parallel conductive path to the sensor 7, the insulating film 18 that is similar to the one illustrated in FIG. 5B is preferably provided between the sensor 7 and the heat conductive film 9.

Next, a manufacturing method of a main part of the magnetic head 3 (mainly the sensor 7, the heat conductive film 9 and the lead films 10), which is configured in the configuration illustrated in FIGS. 5A and 5B, will be explained with reference to FIGS. 10A through 27A. FIGS. 10A, 11A, 12A, 13A, 14A, 15A, 16A, 17A, 18A, 19A, 20A, 21A, 22A, 23A, 24A, 25A, 26A, and 27A are drawings seen from an integration surface side. FIGS. 10B, 12B, 15B, 17B, 18B, 20B, 23B and 26B are drawings seen from the air bearing surface S side and illustrate the enlarged main part (center part) of the cross section through line A-A in each of the drawings. FIGS. 10C, 12C, 15C, 17C, 18C, 20C, 23C, and 26C are drawings seen from the height direction H and illustrate the enlarged main part (center part) of the cross section through line B-B in each of the drawings.

Figure 10A:
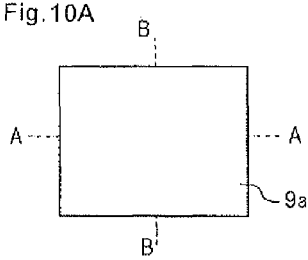
FIG. 10A is a view illustrating a manufacturing method of a main part of the magnetic head of the present invention seen from the integration surface side.
Figure 10B:
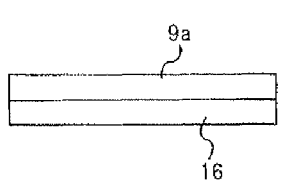
FIG. 10B is a view illustrating the manufacturing method of the main part of the magnetic head of the present invention seen from the air bearing surface side.
Figure 10C:
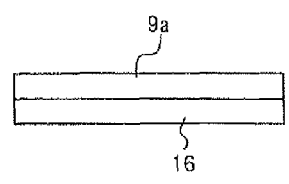
FIG. 10C is a view illustrating the manufacturing method of the main part of the magnetic head of the present invention seen from a height direction.
Figure 11A:
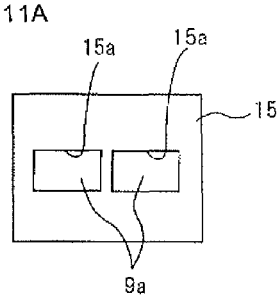
FIG. 11A is a view illustrating a step of the manufacturing method of the main part of the magnetic head of the present invention seen from the integration surface side, the step following FIGS. 10A through 10C.
Figure 12A:
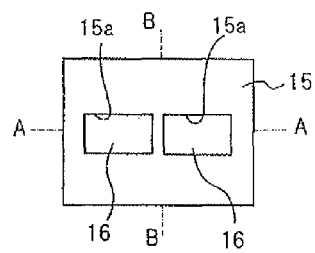
FIG. 12A is a view illustrating a step of the manufacturing method of the main part of the magnetic head of the present invention seen from the integration surface side, the step following FIG. 11A.
Figure 12B:
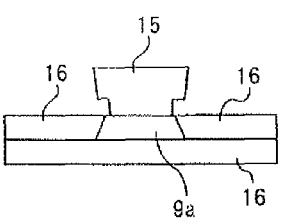
FIG. 12B is a view illustrating the step of the manufacturing method of the main part of the magnetic head of the present invention seen from the air bearing surface side, the step following FIG. 11A.
Figure 12C:
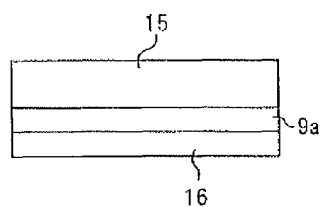
FIG. 12C is a view illustrating the step of the manufacturing method of the main part of the magnetic head of the present invention seen from the height direction, the step following FIG. 11A.
Figure 13A:
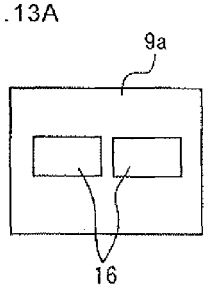
FIG. 13A is a view illustrating a step of the manufacturing method of the main part of the magnetic head of the present invention seen from the integration surface side, the step following FIGS. 12A through 12C.
Figure 14A:
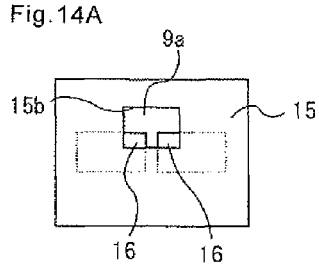
FIG. 14A is a view illustrating a step of the manufacturing method of the main part of the magnetic head of the present invention seen from the integration surface side, the step following FIG. 13A.
Figure 15A:
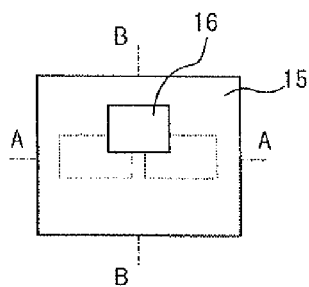
FIG. 15A is a view illustrating a step of the manufacturing method of the main part of the magnetic head of the present invention seen from the integration surface side, the step following FIG. 14A.
Figure 15B:
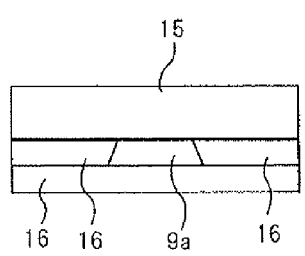
FIG. 15B is a view illustrating the step of the manufacturing method of the main part of the magnetic head of the present invention seen from the air bearing surface side, the step following FIG. 14A.
Figure 15C:
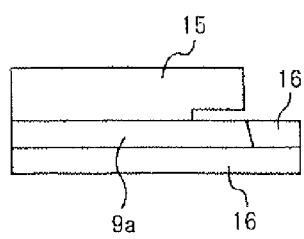
FIG. 15C is a view illustrating the step of the manufacturing method of the main part of the magnetic head of the present invention seen from the height direction, the step following FIG. 14A.
Figure 16A:
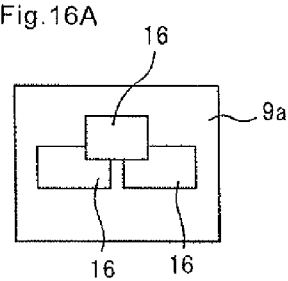
FIG. 16A is a view illustrating a step of the manufacturing method of the main part of the magnetic head of the present invention seen from the integration surface side, the step following FIGS. 15A through 15C.
Figure 17A:
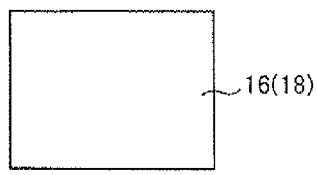
FIG. 17A is a view illustrating a step of the manufacturing method of the main part of the magnetic head of the present invention seen from the integration surface side, the step following FIG. 16A.
Figure 17B:
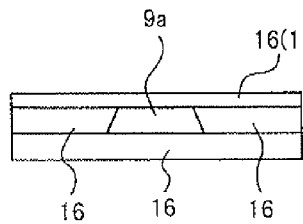
FIG. 17B is a view illustrating the step of the manufacturing method of the main part of the magnetic head of the present invention seen from the air bearing surface side, the step following FIG. 16A.
Figure 17C:
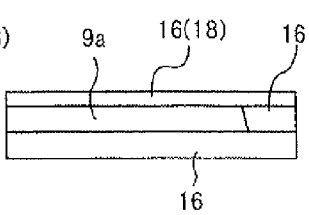
FIG. 17C is a view illustrating the step of the manufacturing method of the main part of the magnetic head of the present invention seen from the height direction, the step following FIG. 16A.

As illustrated in FIGS. 10A through 10C, a metal film (for example, an AuCu film) 9a for the heat conductive film 9 is formed on a member for a base (an insulating film 16 illustrated in FIG. 2). Then, as illustrated in FIG. 11A, a resist pattern 15 having opening parts 15a for patterning the heat conductive film 9 is formed on the metal film 9a. As illustrated in FIGS. 12A through 12C, the metal film 9a in the opening parts 15a is removed by ion milling, and then the insulating film 16 made of alumina or the like is formed. As illustrated in FIG. 13A, the resist pattern 15 is removed, and a part of the metal film 9a and the insulating film 16 are exposed. As illustrated in FIG. 14A, the resist pattern 15 having an opening part 15b for patterning the heat conductive film 9 is formed. As illustrated in FIGS. 15A through 15C, the metal film 9a in the opening part 15b is removed by ion milling, and then the insulating film 16 made of alumina or the like is formed. As illustrated in FIG. 16A, the resist pattern 15 is removed, and the metal film 9a is exposed. As illustrated in FIGS. 17A through 17C, the insulating film 16 is entirely formed. This becomes the insulating film 18.

Figure 23A:
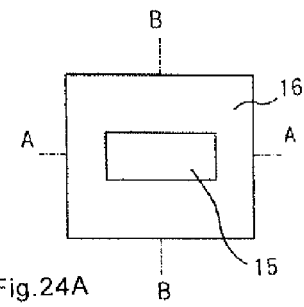
FIG. 23A is a view illustrating a step of the manufacturing method of the main part of the magnetic head of the present invention seen from the integration surface side, the step following FIG. 22A.
Figures 23B, 23C:
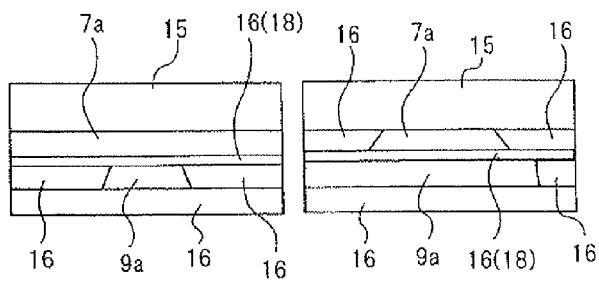
FIG. 23B is a view illustrating the step of the manufacturing method of the main part of the magnetic head of the present invention seen from the air bearing surface side, the step following FIG. 22A.
FIG. 23C is a view illustrating the step of the manufacturing method of the main part of the magnetic head of the present invention seen from the height direction, the step following FIG. 22A.
Figure 24A:
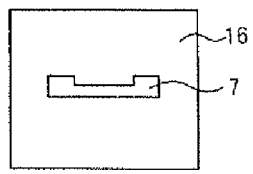
FIG. 24A is a view illustrating a step of the manufacturing method of the main part of the magnetic head of the present invention seen from the integration surface side, the step following FIGS. 23A through 23C.
Figure 25A:
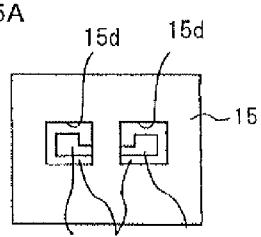
FIG. 25A is a view illustrating a step of the manufacturing method of the main part of the magnetic head of the present invention seen from the integration surface side, the step following FIG. 24A.
Figure 26A:
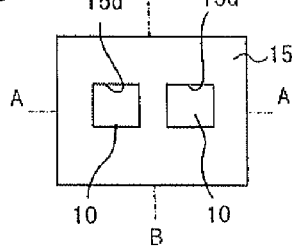
FIG. 26A is a view illustrating a step of the manufacturing method of the main part of the magnetic head of the present invention seen from the integration surface side, the step following FIG. 25A.
Figures 26B, 26C:
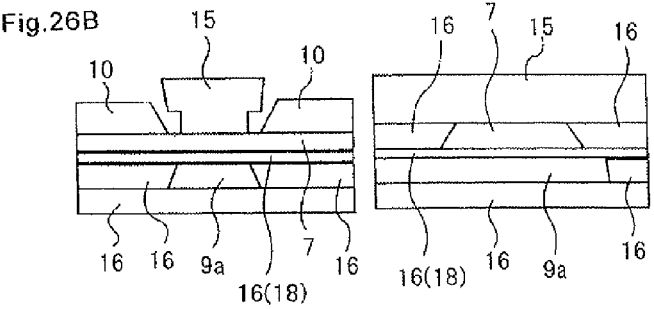
FIG. 26B is a view illustrating the step of the manufacturing method of the main part of the magnetic head of the present invention seen from the air bearing surface side, the step following FIG. 25A.
FIG. 26C is a view illustrating the step of the manufacturing method of the main part of the magnetic head of the present invention seen from the height direction, the step following FIG. 25A.
Figure 27A:
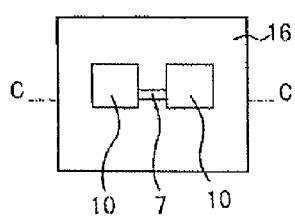
FIG. 27A is a view illustrating a step of the manufacturing method of the main part of the magnetic head of the present invention seen from the integration surface side, the step following FIGS. 26A through 26C.

Next, as illustrated in FIGS. 18A through 18C, a metal film (for example, a NiFe film) 7a to be the sensor 7 is formed on the insulating film 16. Then, as illustrated in FIG. 19A, the resist pattern 15 having opening parts 15c for patterning the sensor 7 are formed on the metal film 7a. As illustrated in FIGS. 20A through 20C, the metal film 7a in the opening parts 15c is removed by ion milling, and the insulating film 16 made of alumina or the like is formed. Then, as illustrated in FIG. 21A, the resist pattern 15 is removed, and a part of the metal film 7a and the insulating film 16 are exposed. As illustrated in FIG. 22A, the resist pattern 15 for patterning the sensor 7, the insulating films 16 and 18, and the heat conductive film 9 thereunder are formed again. Then as illustrated in FIGS. 23A through 23C, the metal film 7a, the insulating films 16 and 18, and the metal film 9a thereunder in the periphery of the resist pattern 15, are removed by ion milling, and then the insulating film 16 made of alumina or the like is formed. As illustrated in FIG. 24A, the resist pattern 15 is removed, and the sensor 7 formed by the metal film 7a is exposed. Then, as illustrated in FIG. 25A, the resist pattern 15 having opening parts 15d for forming the lead films 10 is formed. Then, as illustrated in FIGS. 26A through 26C, the lead films 10 made of a metal (for example, AuCu) in the opening part 15b are formed. A pair of the lead films 10 contacts the both edge parts of the sensor 7 in the opening part 15b. Then, as illustrated in FIG. 27A, the resist pattern 15 is removed. Then, when all constituent elements of the magnetic head 3 including the recording element part 4, etc. are made, processes, such as polishing, are executed from the bottom up as viewed in FIG. 27A. For example, the polishing process is stopped when the polishing process under line C-C is finished to obtain a state illustrated in FIG. 5A. This polished surface is the air bearing surface S. Referring to FIG. 5A, the sensor 7, the heat conductive film 9, and the lead films 10 are exposed on the air bearing surface S. The heat conductive film 9 overlapped a part of the sensor 7 through the insulating film 16 (18). In this example, the heat conductive film 9 is shorter than the interval between the pair of lead films 10, and is not electrically connected in a noncontacting manner to the lead films 10. On the other hand, both edge parts of the sensor 7 contact and are electrically connected to the lead films 10.

In addition, as illustrated in FIGS. 4A and 4B, when manufacturing the magnetic head 3 without the insulating film 18, the process skips the step (for forming the insulating film 16 (18)) illustrated in FIG. 17A.

Figure 28:
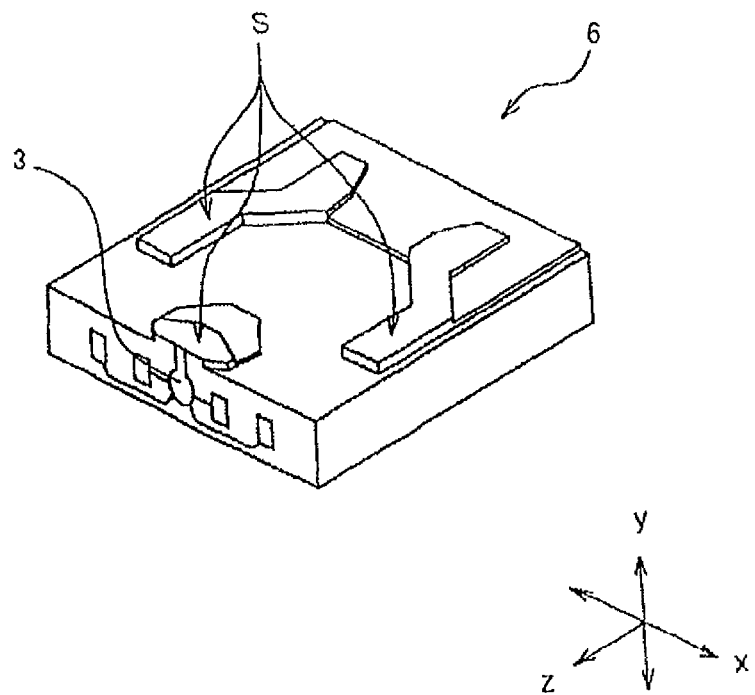
FIG. 28 is a perspective view of a slider including the magnetic head of the present invention.

The slider 6 in which such a magnetic head 3 is formed is illustrated in FIG. 28. The slider 6 has a substantially hexahedral shape, and one surface of the six outer surfaces is the air bearing surface S facing the magnetic disk 1.

Figure 29:
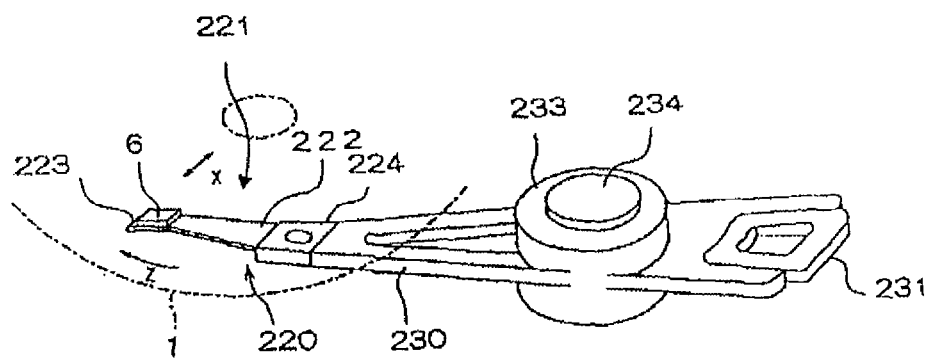
FIG. 29 is a perspective view of a head arm assembly including a head gimbal assembly in which the slider illustrated in FIG. 28 is incorporated.

As illustrated in FIG. 29, a head gimbal assembly 220 has the slider 6 and a suspension 221 elastically supporting the slider 6. The suspension 221 has a load beam 222, a flexure 223, and a base plate 224. The load beam 222 is formed in a plate spring shape and made of stainless steel. The flexure 223 is arranged in one edge part of the load beam 222. The base plate 224 is arranged in the other edge part of the load beam 222. The flexure 223 is joined to the slider 6 to give the slider 6 suitable flexibility. At the part of the flexure 223 to which the slider 210 is attached, a gimbal part is disposed to maintain the slider 6 in an appropriate orientation.

The slider 6 is arranged in the hard disk device such that the slider 6 is opposite to the magnetic disk (hard disk) 1. The magnetic disk 1 is a recording medium having a disk shape and is rotatably driven. When the magnetic disk 1 rotates in the z-direction of FIG. 28, air flow passing between the magnetic disk 1 and the slider 6 generates a downward lifting force in the y-direction to the slider 6. The slider 6 flies from the surface of the magnetic disk 1 due to the lifting force. Additionally, as illustrated in FIG. 1B, the flying height can be fine-tuned using the heat expansion of the slider 6 generated by the heat of the heater 8. In the vicinity of the edge part of the slider 6 (edge part in bottom left of FIG. 28) at the air flow exit side, the thin film shaped magnetic head 3 is formed.

A part in which the head gimbal assembly 220 is mounted on an arm 230 is referred to as a head arm assembly 221. The arm 230 moves the slider 6 in the track crossing direction x of the magnetic disk 1. One edge of the arm 230 is mounted on the base plate 224. On the other edge of the arm 230, a coil 231 is mounted, which forms one part of a voice coil motor. A bearing part 233 is arranged in the middle section of the arm 230. The arm 230 is rotatably supported by a shaft 234 mounted on the bearing part 233. The arm 230 and the voice coil motor for driving the arm 230 configure an actuator.

Figure 30:
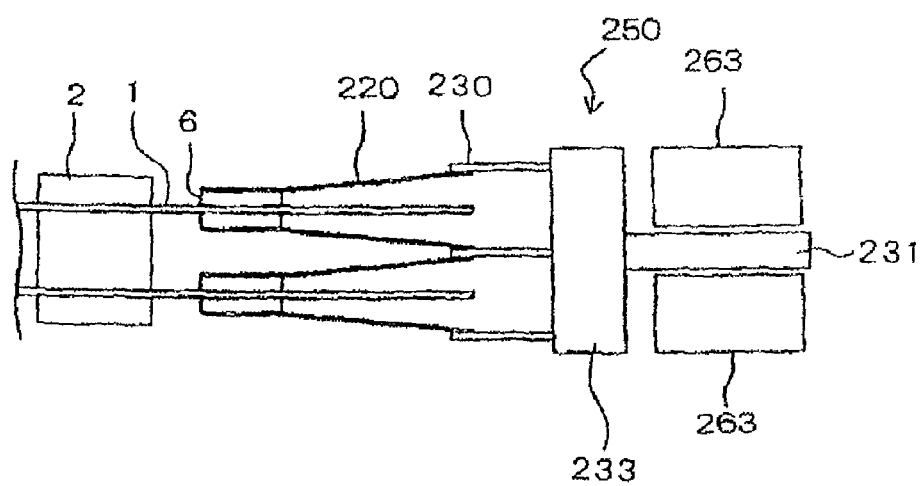
FIG. 30 is a side view of the head arm assembly in which the slider illustrated in FIG. 28 is incorporated.
Figure 31:
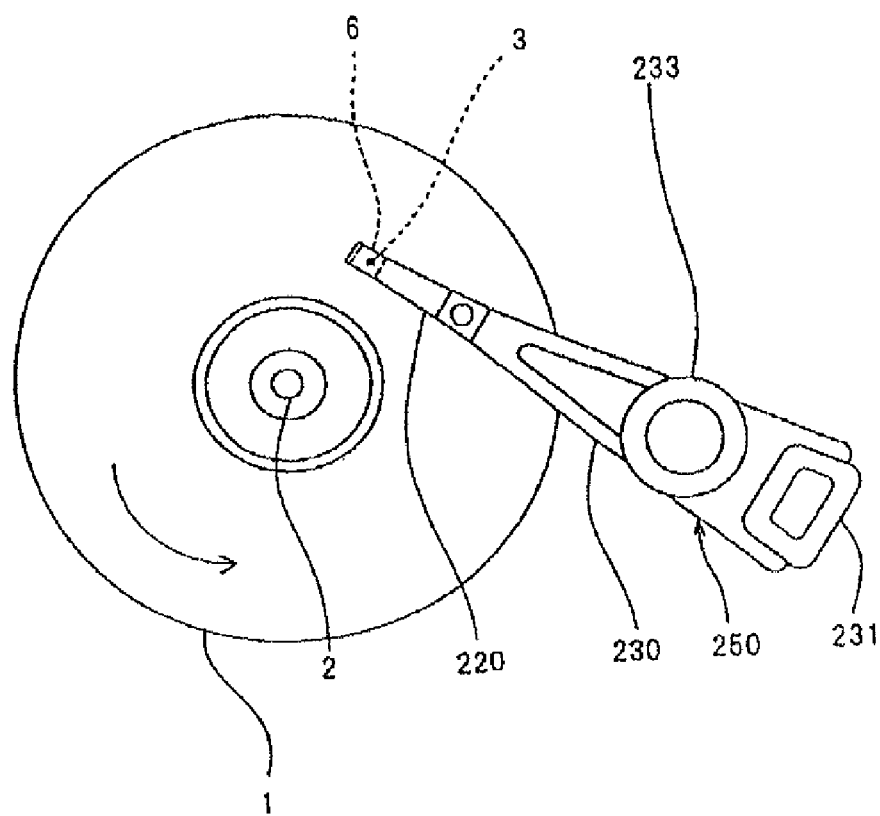
FIG. 31 is a plan view of the hard disk device in which the slider illustrated in FIG. 28 is incorporated.

Next, referring to FIGS. 30 and 31, descriptions of a head stack assembly in which the above-described slider 6 is integrated and the hard disk device will be explained. The head stack assembly includes a carriage having a plurality of arms, wherein a head gimbal assembly 220 is mounted on each arm. FIG. 30 is a side view of the head stack assembly. FIG. 31 is a top plan view of the hard disk device. The head stack assembly 250 includes a carriage having a plurality of arms 230. The carriage configures the pre-described bearing part 233. On each arm 230, the head gimbal assemblies 220 are mounted so as to align at an interval in the vertical direction. At the carriage in the opposite side of arm 230, the coil 231 is mounted to be a part of the voice coil motor. The voice coil motor has permanent magnets 263 arranged facing each other on both sides of the coil 231.

Referring to FIG. 31, the head stack assembly 250 is integrated in the hard disk device. The hard disk device has multiple magnetic disks 1 mounted on a spindle motor 2 that is the rotatably supporting mechanism. For each magnetic disk 1, two sliders 6 are arranged facing each other through the magnetic disk 1. The head stack assembly 250 except the slider 6 and an actuator, corresponding to a positioning device of the present invention, not only support the slider 6 but also position the slider 6 with respect to the magnetic disk 1. The slider 6 is moved in the track crossing direction of the magnetic disk 1 by the actuator, and is positioned with respect to the magnetic disk 1. The film shaped magnetic head 3 included in the slider 6 records the magnetic information on the magnetic disk 1 by the recording element part 4 of the magnetic head 3, and reproduces the information recorded on the magnetic disk 1 by the reproducing element part 5.

A description of the preferred embodiment according to the present invention was given above in detail. However, it should be appreciated that a wide variety of alterations and modifications are possible as far as they do not depart from the spirit and scope of the attached claims.

What is claimed is:

1. A magnetic head disposed in a slider that is arranged at an interval from a magnetic disk, comprising:
    a sensor disposed in a position that is opposed to the magnetic disk;
    a heat conductive film that is positioned on an air bearing surface opposed to the magnetic disk, and that is formed so as to overlap the sensor, of which a height in a direction perpendicular to the air bearing surface is more than a height of the sensor, and that transfers a temperature change of the air bearing surface to the sensor; and
    a pair of lead films electrically connected to the sensor and not electrically connected to the heat conductive film, wherein
    the sensor detects presence of a projection on a surface of the magnetic disk.

2. The magnetic head according to claim 1, wherein the heat conductive film overlaps the sensor either directly or through an insulating film.

3. The magnetic head according to claim 1, wherein the sensor is positioned stepped back from the air bearing surface by a distance in a range from 10 nm to 200 nm.

4. The magnetic head according to claim 1, wherein the pair of lead films is respectively connected to both edge parts of the sensor in a track direction of the magnetic disk, and a width of the heat conductive film is narrower than a width of the sensor in the track direction.

5. The magnetic head according to claim 1, wherein the pair of lead films is respectively connected to both edge parts of the sensor in a track direction of the magnetic disk, and a width of the heat conductive film is narrower than an interval between the pair of lead films in the track direction.

6. The magnetic head according to claim 1, wherein the pair of lead films is respectively connected to both edge parts of the sensor in a track direction of the magnetic disk, a width of the heat conductive film is more than a width of the sensor in the track direction, and an insulating film is positioned between the heat conductive film and the sensor.

7. The magnetic head according to claim 1, wherein the pair of lead films is respectively connected to both edge parts of the sensor in a track direction of the magnetic disk, a width of the heat conductive film is more than an interval between the pair of lead films in the track direction, and the insulating film is positioned between the heat conductive film and the sensor.

8. The magnetic head according to claim 1, wherein an electrical resistance value of the sensor is changed due to a temperature change of the air bearing surface transferred through the heat conductive film, and the pair of lead films is respectively connected to both edge parts of the sensor and applies voltage to the sensor.

9. The magnetic head according to claim 1, wherein
the presence of a projection is detected when an electrical resistance value of the sensor is changed due to friction on the magnetic head.

10. The magnetic head according to claim 1, wherein
the sensor detects a physical contact of the magnetic head with the magnetic disk.

11. The magnetic head according to claim 1, wherein
the sensor indicates a contact of the magnetic head with the magnetic disk by having a change in an electrical resistance value of the sensor.

12. The magnetic head according to claim 11, wherein
the change in the electrical resistance value is caused by a temperature change from a friction due to the contact of the magnetic head with the magnetic disk.

13. A magnetic head disposed in a slider that is arranged at an interval from a magnetic disk, comprising:
a sensor disposed in a position that is opposed to the magnetic disk;
a heat conductive film that is positioned on an air bearing surface opposed to the magnetic disk, and that is formed so as to overlap the sensor, of which a height in a direction perpendicular to the air bearing surface is more than a height of the sensor, and that transfers a temperature change of the air bearing surface to the sensor;
a pair of lead films electrically connected to the sensor and not electrically connected to the heat conductive film; and
a heater that is disposed in the slider, and that enables a flying height of the magnetic head from the magnetic disk to be small by causing heat expansion of the slider.

14. The magnetic head according to claim 13, wherein the sensor is positioned stepped back from the air bearing surface by a distance in a range from 10 nm to 200 nm.

15. The magnetic head according to claim 13, wherein the pair of lead films is respectively connected to both edge parts of the sensor in a track direction of the magnetic disk, and a width of the heat conductive film is narrower than a width of the sensor in the track direction.

16. The magnetic head according to claim 13, wherein the pair of lead films is respectively connected to both edge parts of the sensor in a track direction of the magnetic disk, and a width of the heat conductive film is narrower than an interval between the pair of lead films in the track direction.

17. The magnetic head according to claim 13, wherein the pair of lead films is respectively connected to both edge parts of the sensor in a track direction of the magnetic disk, a width of the heat conductive film is more than a width of the sensor in the track direction, and an insulating film is positioned between the heat conductive film and the sensor.

18. The magnetic head according to claim 13, wherein the pair of lead films is respectively connected to both edge parts of the sensor in a track direction of the magnetic disk, a width of the heat conductive film is more than an interval between the pair of lead films in the track direction, and the insulating film is positioned between the heat conductive film and the sensor.

* * * * *